US009341368B2

(12) United States Patent
Sugatani et al.

(10) Patent No.: US 9,341,368 B2
(45) Date of Patent: May 17, 2016

(54) METHOD OF INSTALLING EXHAUST TUBE

(71) Applicant: NORITZ CORPORATION, Hyogo (JP)

(72) Inventors: Masaki Sugatani, Akashi (JP); Hironao Matsunaga, Amagasaki (JP)

(73) Assignee: NORITZ CORPORATION, Hyogo (JP)

( * ) Notice: Subject to any disclaimer, the term of this patent is extended or adjusted under 35 U.S.C. 154(b) by 1 day.

(21) Appl. No.: 14/466,435

(22) Filed: Aug. 22, 2014

(65) Prior Publication Data
US 2016/0053995 A1 Feb. 25, 2016

(51) Int. Cl.
*B21D 39/00* (2006.01)
*F23J 13/02* (2006.01)
*F23J 13/04* (2006.01)
*F23J 13/06* (2006.01)
*F16L 55/115* (2006.01)
*F16L 11/15* (2006.01)
*F16L 101/20* (2006.01)
*F16L 55/11* (2006.01)

(52) U.S. Cl.
CPC ............... *F23J 13/025* (2013.01); *B21D 39/00* (2013.01); *F16L 55/11* (2013.01); *F16L 55/115* (2013.01); *F23J 13/04* (2013.01); *F23J 13/06* (2013.01); *F16L 11/15* (2013.01); *F16L 55/1141* (2013.01); *F16L 2101/20* (2013.01)

(58) Field of Classification Search
CPC .. Y10T 29/49732; F16L 11/15; F16L 59/121; F16L 59/123; F16L 59/13; F16L 2101/20; F16L 2101/18; F16L 57/005; F16L 55/1652; F16L 55/1141; F16L 55/11; F16L 55/115; F16L 55/13; F16L 55/1286; B21D 39/00
See application file for complete search history.

(56) References Cited

U.S. PATENT DOCUMENTS

| | | | | | |
|---|---|---|---|---|---|
| 3,821,969 | A | * | 7/1974 | Sinko | B65D 59/02 138/89 |
| 8,413,689 | B1 | * | 4/2013 | Taylor | F16L 55/11 138/89 |
| 2012/0192980 | A1 | * | 8/2012 | Williams | F16L 55/11 138/89 |

FOREIGN PATENT DOCUMENTS

| | | | | |
|---|---|---|---|---|
| DE | 10244263 A1 | * | 3/2004 | ............. E04F 11/18 |
| JP | 2002-188755 A | | 7/2002 | |

* cited by examiner

*Primary Examiner* — Jermie Cozart
(74) *Attorney, Agent, or Firm* — Studebaker & Brackett PC

(57) ABSTRACT

A method of installing an exhaust tube is implemented by inserting an exhaust tube into an exhaust pipe that leads from inside of a building to outside thereof. A support portion of an insertion jig is introduced into a through hole from a side of one end portion of the exhaust tube, and a projection of the support portion is engaged with a recess of the exhaust tube, so that the insertion jig is fixed to the exhaust tube. An end of the exhaust tube on the side of the one end portion having the insertion jig fixed thereto is inserted into the exhaust pipe, and the exhaust tube is pushed from inside of the building to outside thereof.

10 Claims, 13 Drawing Sheets

METHOD OF INSTALLING EXHAUST TUBE

BACKGROUND OF THE INVENTION

1. Field of the Invention

The present invention relates to a method of installing an exhaust tube.

2. Description of the Background Art

In markets, there are locations where an exhaust pipe (a B vent) already placed in a building cannot be removed from a point of view of maintaining appearance of buildings. At such a location, a combustion apparatus can be replaced by inserting a new exhaust tube (a flexible exhaust tube) into the exhaust pipe and an exhaust terminal (a rain cap) which have already been placed.

Although not a technique related to an exhaust pipe of a combustion apparatus, a method of inserting a corrugated tube made of resin into a pipe such as a gas pipe and a water pipe is disclosed, for example, in Japanese Patent Laying-Open No. 2002-188755. This document discloses a traction jig for a corrugated tube.

When a new exhaust tube is inserted into the already-placed exhaust pipe from inside of a building, the tip end of the exhaust tube gets caught in the inner circumferential surface of the exhaust pipe, which causes a problem that it becomes difficult to push the exhaust tube in. Furthermore, the tip end of the exhaust tube gets caught in the inner circumferential surface of the exhaust pipe, which also causes a problem that foreign substances adhering to the inner circumferential surface of the exhaust pipe come off and come into the exhaust tube. Also, the traction jig disclosed in the above-mentioned document is divided into a plurality of parts and fixed to a corrugated tube, which also causes a problem that the traction jig is attached to the corrugated tube with difficulty.

SUMMARY OF THE INVENTION

The present invention has been made in light of the above-described problems. An object of the present invention is to provide a method of installing an exhaust tube, by which the exhaust tube can be readily pushed in, entry of foreign substances into the exhaust tube can be suppressed, and an insertion jig can be readily attached to the exhaust tube.

A method of installing an exhaust tube according to the present invention is implemented by inserting an exhaust tube into an exhaust pipe leading from inside of a building to outside thereof. The method includes the following steps. The exhaust tube is prepared, which has one end portion and the other end portion, a through hole extending from the one end portion to the other end portion, and a recess provided in an inner circumferential surface of the through hole. The exhaust tube is formed of a flexible tube made of resin. An insertion jig is prepared, which includes an outer circumferential surface, a support portion having a projection that projects from the outer circumferential surface toward outside, and a protruding portion that protrudes from the support portion to a side opposite to the exhaust tube in a state where the support portion is introduced into the through hole from a side of the one end portion of the exhaust tube. The protruding portion covers the through hole on the side of the one end portion of the exhaust tube. The support portion and the protruding portion are integrally formed. The support portion of the insertion jig is introduced into the through hole from the side of the one end portion of the exhaust tube, and the projection of the support portion is engaged with the recess, to fix the insertion jig to the exhaust tube. An end of the exhaust tube on the side of the one end portion having the insertion jig fixed thereto is inserted into the exhaust pipe, and the exhaust tube is pushed from inside of the building to outside thereof.

According to the method of installing an exhaust tube of the present invention, since the insertion jig is fixed to the exhaust tube at the one end portion, the one end portion of the exhaust tube does not get caught in the inner circumferential surface of the exhaust pipe. Accordingly, the exhaust tube can be readily pushed in. Furthermore, since the protruding portion of the insertion jig covers the through hole on the one end portion side of the exhaust tube, entry of foreign substances into the exhaust tube through the through hole on the one end portion side of the exhaust tube can be suppressed. Furthermore, since the insertion jig has the support portion and the protruding portion integrally formed, the support portion and the protruding portion can be integrally attached. Accordingly, the insertion jig can readily be attached to the exhaust tube.

In the method of installing an exhaust tube described above, the protruding portion is curved convexly toward a side opposite to the support portion. Accordingly, when the insertion jig is fixed to the exhaust tube and inserted into the exhaust pipe, the frictional resistance between the protruding portion and the inner circumferential surface of the exhaust pipe can be reduced. Thereby, the exhaust tube having the insertion jig fixed thereto can be smoothly pushed into the exhaust pipe.

In the method of installing an exhaust tube described above, the insertion jig is formed of a resin molding product, and the protruding portion has a surface that is subjected to low friction processing such that the surface is lower in coefficient of friction than a surface of the exhaust tube. Accordingly, when the insertion jig is fixed to the exhaust tube and inserted into the exhaust pipe, the frictional resistance between the protruding portion and the inner circumferential surface of the exhaust pipe can be further reduced. Thereby, the exhaust tube having the insertion jig fixed thereto can be further more smoothly pushed into the exhaust pipe.

In the method of installing an exhaust tube described above, the protruding portion can be deformed by coming into contact with an inner circumferential surface of the exhaust pipe. Accordingly, when the insertion jig is fixed to the exhaust tube and inserted into the exhaust pipe, the protruding portion is deformed by coming into contact with the inner circumferential surface of the exhaust pipe. Thereby, since the protruding portion is deformed corresponding to the shape of the inner circumferential surface of the exhaust pipe, the exhaust tube having the insertion jig fixed thereto can be pushed into the exhaust pipe with reduced force.

In the method of installing an exhaust tube described above, the projection includes a tip end portion and a root portion, and has a first inclined surface that inclines from the tip end portion toward the root portion on a side of the other end portion. Accordingly, when the support portion is introduced into the through hole from the one end portion side of the exhaust tube, the frictional resistance between the projection and the inner circumferential surface of the exhaust tube can be reduced by the first inclined surface.

In the method of installing an exhaust tube described above, the projection includes a tip end portion and a root portion, and has a second inclined surface that inclines from the tip end portion toward the root portion on the side of the one end portion. Accordingly, when the support portion is pulled out from the through hole of the exhaust tube, the frictional resistance between the projection and the inner circumferential surface of the exhaust tube can be reduced by the second inclined surface.

In the method of installing an exhaust tube described above, at a tip end portion of the exhaust pipe on outside of the building, the support portion of the insertion jig is pulled out from the side of the one end portion of the exhaust tube. Accordingly, the insertion jig can be removed from the exhaust tube by pulling out this insertion jig from the exhaust tube. Therefore, the insertion jig can be readily removed from the exhaust tube.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention will be hereinafter described with reference to the drawings.

An exhaust structure for a combustion apparatus in one embodiment of the present invention will be first described.

Figure 1:
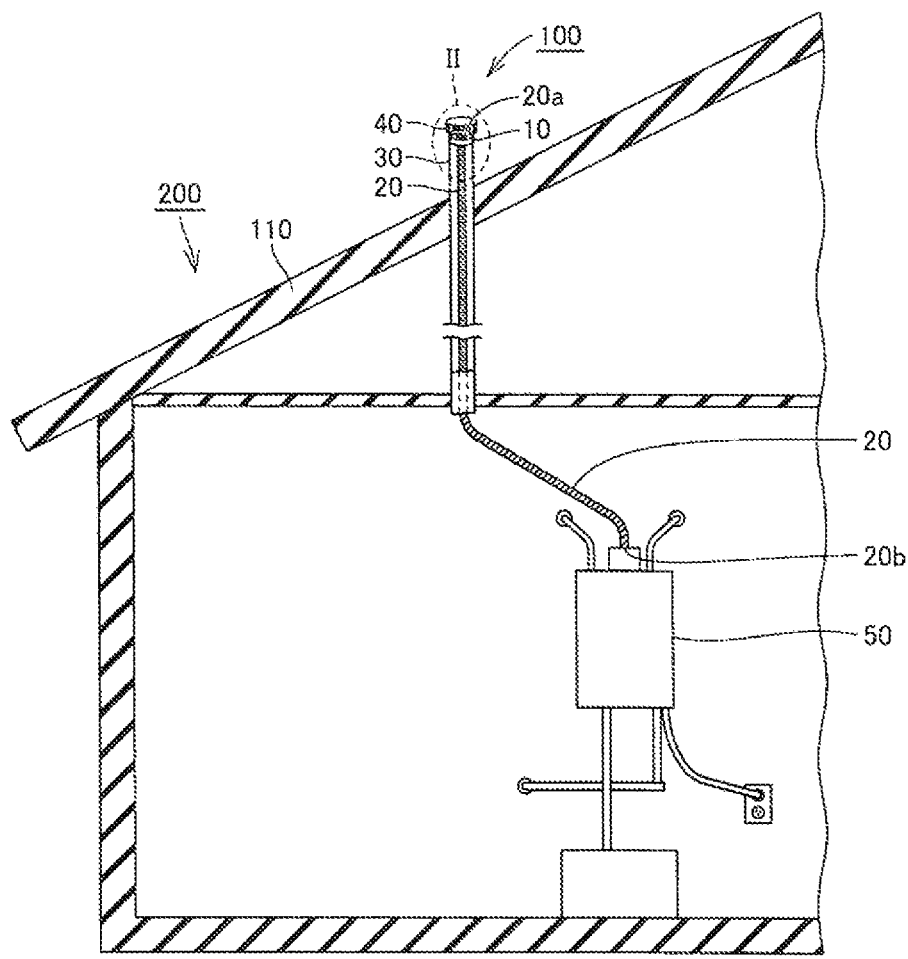
FIG. 1 is a diagram schematically showing the state where an exhaust structure for combustion apparatus in one embodiment of the present invention is placed in a building.
Figure 2:
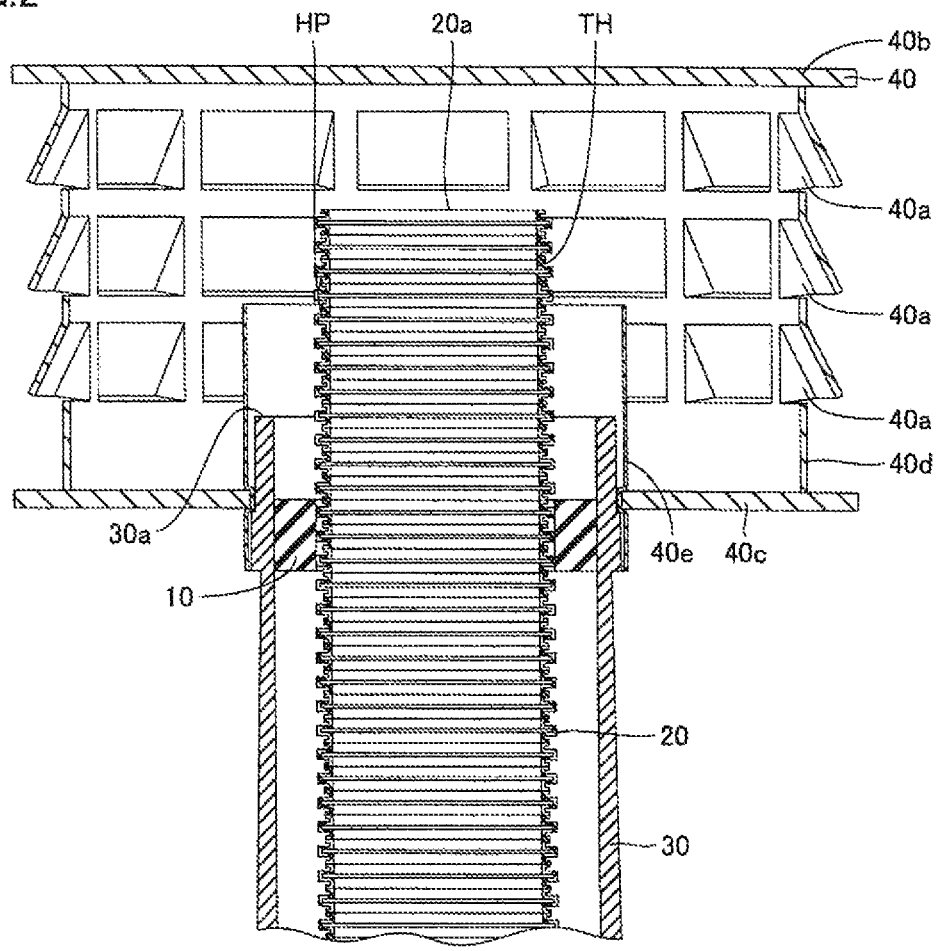
FIG. 2 is a cross-sectional view showing, in an enlarged manner, a region II in FIG. 1.
Figure 3:
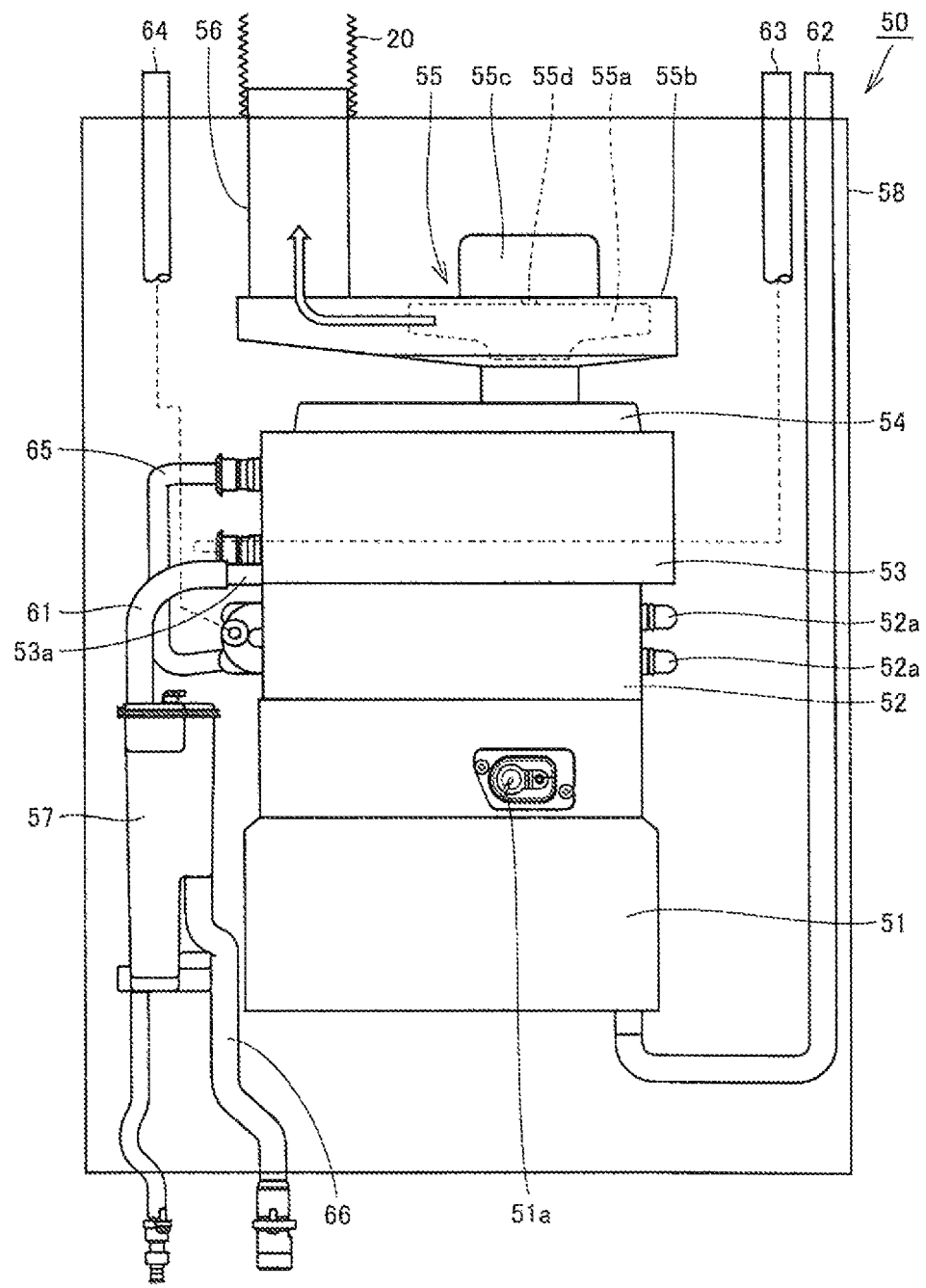
FIG. 3 is a front view schematically showing the configuration of a water heater as an example of a combustion apparatus included in the exhaust structure for combustion apparatus in one embodiment of the present invention.

Referring to FIGS. 1 to 3, an exhaust structure for combustion apparatus 100 in the present embodiment mainly has an exhaust adapter 10, an exhaust tube 20, an exhaust pipe 30, an exhaust terminal 40, and a combustion apparatus 50. This exhaust structure for combustion apparatus 100 serves to emit combustion gas produced in combustion apparatus 50 to the outside of a building 200.

Combustion apparatus 50 is placed inside building 200. This combustion apparatus 50 serves as a water heater that heats warm water and water, for example, with combustion gas, and may be a heating apparatus or the like that warms up the inside of the building with combustion gas. Furthermore, in the case where a water heater is used as combustion apparatus 50, this water heater may be, for example, a water heater of a latent heat recovery type adapted to an exhaust suction and combustion system.

Exhaust tube 20 includes one end portion 20a and the other end portion 20b. Furthermore, exhaust tube 20 has a through hole TH extending from one end portion 20a to the other end portion 20b. One end portion 20a of exhaust tube 20 extends to the outside of the building, and the other end portion 20b thereof is connected to combustion apparatus 50. The inside of exhaust tube 20 is defined as an emission path for the combustion gas emitted from combustion apparatus 50. Thus, the combustion gas produced in combustion apparatus 50 can be guided to the outside of the building through exhaust tube 20.

Exhaust tube 20 has a recess HP provided in the inner circumferential surface of through hole TH. In the present embodiment, recess HP is provided along the entire circumference of the inner circumferential surface of through hole TH in the circumferential direction. A plurality of recesses HP are provided. In addition, recesses HP only have to be provided in a part of the inner circumferential surface of through hole TH in the circumferential direction. The number of recesses HP may be one.

Exhaust tube 20 is formed of a flexible tube made of resin. Specifically, exhaust tube 20 is implemented as a flexible pipe such as an accordion pipe, but may be a spiral pipe and the like. This allows exhaust tube 20 to conform also to the shape of exhaust pipe 30 having a complicated shape. Furthermore, since an exhaust flows through exhaust tube 20, this exhaust tube 20 can be suitably made of a material having acidic resistance. This is because acidic drainage water may be discharged together with an exhaust in the case where combustion apparatus 50 is a water heater of a latent heat recovery type as in the present embodiment.

Accordingly, exhaust tube 20 can be made of a material having acidic resistance such as phenol resin, epoxy resin, silicone resin, fluorine resin such as polytetrafluoroethylene, unsaturated polyester resin, melamine resin, polycarbonate resin, methacryl styrene (MS) resin, methacryl resin, styrene acrylonitrile copolymer (AS) resin, ABS resin, polyethylene, polypropylene, polystyrene, polyethylene terephthalate (PET), and vinyl chloride resin, for example.

Exhaust pipe 30 is attached to building 200 so as to extend from the inside to the outside, for example, through a roof 110 of building 200. Exhaust pipe 30 may extend from the inside to the outside through a wall. Exhaust pipe 30 is greater in outer diameter than exhaust tube 20. In the inside of this exhaust pipe 30, a part of exhaust tube 20 on the side of one end portion 20a is inserted. Exhaust pipe 30 is formed of metal, for example.

Exhaust terminal 40 is attached to a tip end of exhaust pipe 30 on the outdoor side. This exhaust terminal 40 has a ceiling wall 40b, a bottom wall 40c, a circumferential wall 40d, and a connection pipe portion 40e. Ceiling wall 40b is attached to an upper end of circumferential wall 40d, and bottom wall 40c is attached to a lower end of circumferential wall 40d. Connection pipe portion 40e has a cylindrical shape and is attached to bottom wall 40c so as to penetrate bottom wall 40c. In circumferential wall 40d, an exhaust port 40a for exhausting the combustion gas to the outside (outdoors) is formed. This exhaust port 40a allows the combustion gas guided through exhaust tube 20 to be exhausted from exhaust terminal 40 to the outside of building 200 through exhaust pipe 30.

Connection pipe portion 40e of exhaust terminal 40 is connected to exhaust pipe 30. This connection pipe portion 40e may be an outer cover attached on an outer circumferential side of exhaust pipe 30 or an inner cover attached on an inner circumferential side of exhaust pipe 30. Exhaust terminal 40 is made, for example, of such a material as aluminum or stainless steel.

Exhaust adapter 10 serves to fix exhaust tube 20 to exhaust pipe 30. Exhaust adapter 10 has an annular shape that surrounds a through hole. Exhaust adapter 10 is attached to the outer circumferential surface of exhaust tube 20 and also to the inner circumferential surface of exhaust pipe 30 by inserting exhaust tube 20 into the through hole. Specifically, this exhaust adapter 10 is fitted on the outer circumferential surface of exhaust tube 20 and fitted on the inner circumferential surface of exhaust pipe 30. Exhaust adapter 10 has an inner circumferential surface that presses the outer circumferential surface of exhaust tube 20 in the state where this exhaust adapter 40 is fitted on the outer circumferential surface of exhaust tube 20; and an outer circumferential surface that presses the inner circumferential surface of exhaust pipe 30 in the state where exhaust adapter 40 is fitted on the inner circumferential surface of exhaust pipe 30.

Consequently, the inner circumferential surface of exhaust adapter 10 comes into close contact with the outer circumferential surface of exhaust tube 20 while the outer circumferential surface of exhaust adapter 10 comes into close contact with the inner circumferential surface of exhaust pipe 30. Accordingly, exhaust adapter 10 can firmly fix exhaust tube 20 to exhaust pipe 30, and also, can prevent combustion gas or drainage water from leaking through between exhaust tube 20 and exhaust pipe 30 and flowing back into the room.

The above-described configuration can be readily achieved, for example, by exhaust adapter 10 made of an elastic material. This elastic material is for example preferably a soft resin, or for example preferably EPDM (Ethylene-Propylene-Diene Monomer), soft PVC (polyvinyl chloride), silicone rubber, fluororubber, chloroprene rubber (CR), butyl rubber (IIR), or the like. Furthermore, exhaust adapter 10 may be made of one type elastic material, or may be made of a combination of a plurality of different types of elastic materials.

Combustion apparatus 50 used in exhaust structure for combustion apparatus 100 described above may be a water heater of a latent heat recovery type, for example, adapted to an exhaust suction and combustion system, as described above. The configuration of the water heater of a latent heat recovery type adapted to the exhaust suction and combustion system will be described below.

Figure 4:
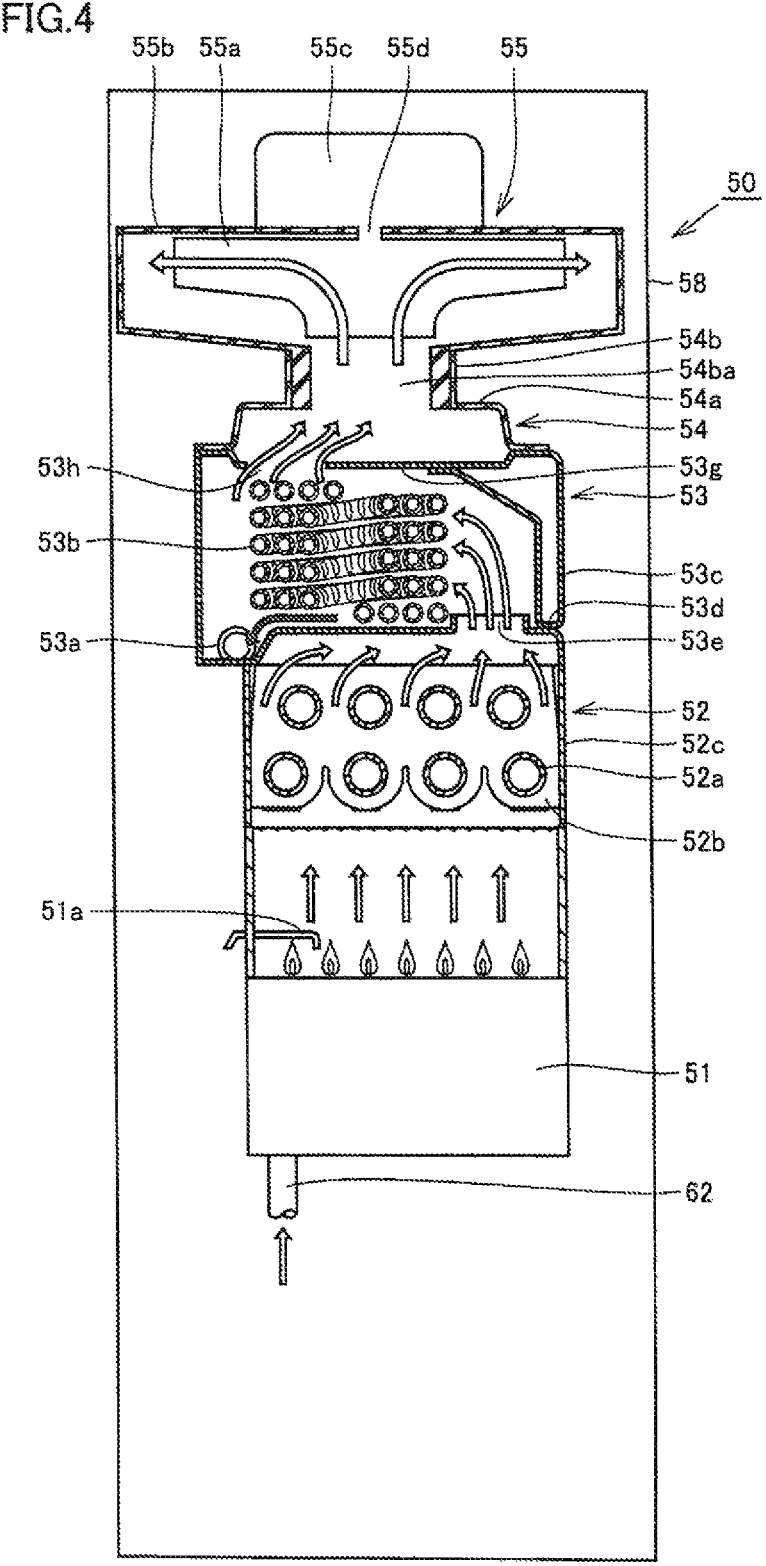
FIG. 4 is a partial cross-sectional side view schematically showing the configuration of the water heater shown in FIG. 3.

Referring to FIGS. 3 and 4, combustion apparatus 50 mainly has a burner 51, a primary heat exchanger 52, a secondary heat exchanger 53, an exhaust box 54, a fan 55, a connection pipe 56, a drainage water tank 57, a housing 58, and pipes 61 to 66.

Burner 51 serves to produce combustion gas by burning fuel gas. A gas supply pipe 62 is connected to burner 51. This gas supply pipe 62 serves to supply fuel gas to burner 51. A gas valve (not shown) implemented, for example, by an electromagnetic valve is attached to this gas supply pipe 62.

A spark plug 51a is disposed above burner 51. This spark plug 51a serves to ignite an air fuel mixture injected from burner 51 to thereby produce a flame, by generating sparks between the plug and a target (not shown) provided in burner 51 by activating an ignition device (an igniter). Burner 51 generates a quantity of heat by burning fuel gas supplied from gas supply pipe 62 (which is called a combustion operation).

Primary heat exchanger 52 is a heat exchanger of a sensible heat recovery type. This primary heat exchanger 52 mainly has a plurality of plate-shaped fins 52b, a heat conduction pipe 52a penetrating the plurality of plate-shaped fins 52b, and a case 52c accommodating fins 52b and heat conduction pipe 52a. Primary heat exchanger 52 exchanges heat with the combustion gas generated by burner 51, and specifically, it serves to heat hot water and water which flows through heat conduction pipe 52a of primary heat exchanger 52 with the quantity of heat generated as a result of the combustion operation of burner 51.

Secondary heat exchanger 53 is a heat exchanger of a latent heat recovery type. This secondary heat exchanger 53 is located downstream of primary heat exchanger 52 in a flow of the combustion gas and connected in series with primary heat exchanger 52. Since combustion apparatus 50 according to the present embodiment thus has secondary heat exchanger 53 of a latent heat recovery type, it serves as a combustion apparatus 50 of a latent heat recovery type.

Secondary heat exchanger 53 mainly has a drainage water discharge port 53a, a heat conduction pipe 53b, a sidewall 53c, a bottom wall 53d, and an upper wall 53g. Heat conduction pipe 53b is layered as it is spirally wound. Sidewall 53c, bottom wall 53d and upper wall 53g are arranged to surround heat conduction pipe 53b.

In secondary heat exchanger 53, hot water and water which flows through heat conduction pipe 53b is pre-heated (heated) through heat exchange with the combustion gas of which heat has been exchanged in primary heat exchanger 52. As a temperature of the combustion gas is lowered to approximately 60° C. through this process, moisture contained in the combustion gas is condensed so that latent heat can be obtained. In addition, latent heat is recovered in secondary heat exchanger 53 and moisture contained in the combustion gas is condensed, whereby drainage water is produced.

Bottom wall 53d serves as a partition between primary heat exchanger 52 and secondary heat exchanger 53, and it also serves as an upper wall of primary heat exchanger 52. This bottom wall 53d is provided with an opening portion 53e, and this opening portion 53e allows communication between a space where heat conduction pipe 52a of primary heat exchanger 52 is arranged and a space where heat conduction pipe 53b of secondary heat exchanger 53 is arranged. As shown by hollow arrows in FIG. 4, the combustion gas can flow from primary heat exchanger 52 to secondary heat exchanger 53 through opening portion 53e. In this embodiment, for the sake of simplification, although one common component is employed for bottom wall 53d of secondary heat exchanger 53 and the upper wall of primary heat exchanger 52, an exhaust collection and guide member may be connected between primary heat exchanger 52 and secondary heat exchanger 53.

Upper wall 53g is provided with an opening portion 53h, and this opening portion 53h allows communication between the space where heat conduction pipe 53b of secondary heat exchanger 53 is arranged and an internal space in exhaust box 54. As shown by hollow arrows in FIG. 4, the combustion gas can flow from secondary heat exchanger 53 into the internal space in exhaust box 54 through opening portion 53h.

Drainage water discharge port 53a is provided in sidewall 53c or bottom wall 53d. This drainage water discharge port 53a opens at a lowest position in the space surrounded by side wall 53c, bottom wall 53d and upper wall 53g (the lowermost position in the vertical direction in the state where the water heater is placed), which is lower than the lowermost portion of heat conduction pipe 53b. Thus, drainage water produced in secondary heat exchanger 53 can be guided to drainage water discharge port 53a along bottom wall 53d and sidewall 53c as shown by a black arrow in FIG. 4.

Exhaust box 54 forms a path for a flow of the combustion gas between secondary heat exchanger 53 and fan 55. This exhaust box 54 can guide, to fan 55, the combustion gas of which heat has been exchanged in secondary heat exchanger 53. Exhaust box 54 is attached to secondary heat exchanger 53 and located downstream of secondary heat exchanger 53 in the flow of the combustion gas.

Exhaust box 54 mainly has a box main body 54a and a fan connection portion 54b. An internal space in box main body 54a communicates through opening portion 53h in secondary heat exchanger 53 with the internal space where heat conduction pipe 53b of secondary heat exchanger 53 is arranged. Fan connection portion 54b is provided so as to protrude from an upper portion of box main body 54a. This fan connection portion 54b has, for example, a cylindrical shape, and an internal space 54ba thereof communicates with the internal space in box main body 54a.

Fan 55 serves to emit the combustion gas (of which heat has been exchanged in secondary heat exchanger 53), which has passed through secondary heat exchanger 53, to the outside of combustion apparatus 50 by suctioning the combustion gas. This fan 55 is located downstream of exhaust box 54 and secondary heat exchanger 53 in the flow of the combustion gas. Namely, in combustion apparatus 50, burner 51, primary heat exchanger 52, secondary heat exchanger 53, exhaust box 54, and fan 55 are arranged in this order from upstream to downstream in the flow of the combustion gas produced in burner 51. Since the combustion gas is suctioned and exhausted by means of fan 55 as above in this arrangement, combustion apparatus 50 in the present embodiment is a water heater adapted to the exhaust suction and combustion system.

Fan 55 mainly has a rotor 55a, a fan case 55b, a drive source 55c, and a rotation shaft 55d. Fan case 55b is attached to fan connection portion 54b of exhaust box 54 such that the internal space in fan case 55b and the internal space in fan connection portion 54b communicate with each other. Thus, as shown by the hollow arrows in FIG. 4, the combustion gas can be suctioned from box main body 54a of exhaust box 54 through fan connection portion 54b into fan case 55b.

Rotor 55a is arranged in fan case 55b. This rotor 55a is connected to drive source 55c with rotation shaft 55d interposed therebetween. Thus, rotor 55a is provided with drive force from drive source 55c and can rotate around rotation shaft 55d. By rotation of rotor 55a, the combustion gas in exhaust box 54 can be suctioned from the inner circumferential side of rotor 55a and can be emitted to the outer circumferential side of rotor 55a.

Connection pipe 56 is connected to a region within fan case 55b, on the outer circumferential side of a region where rotor 55a is arranged. Therefore, the combustion gas emitted to the outer circumferential side of rotor 55a by rotor 55a of fan 55 can be emitted into exhaust tube 20 through connection pipe 56.

The combustion gas produced by burner 51 as above is suctioned by fan 55 by rotation of rotor 55a above, so that the combustion gas can reach fan 55 after passage through primary heat exchanger 52, secondary heat exchanger 53 and exhaust box 54 in this order as shown by the hollow arrows in FIG. 4 and can be emitted to the outside of combustion apparatus 50.

Drainage water tank 57 serves to store drainage water produced in secondary heat exchanger 53. This drainage water tank 57 is connected to secondary heat exchanger 53 through pipe 61. Pipe 61 is connected to drainage water discharge port 53a of secondary heat exchanger 53. Thus, the drainage water produced in secondary heat exchanger 53 can be discharged to drainage water tank 57. A pipe 66 extending to the outside of combustion apparatus 50 is connected to drainage water tank 57. The drainage water stored in drainage water tank 57 can be discharged to the outside of combustion apparatus 50 through this pipe 66.

This drainage water tank 57 has a water seal structure. Namely, drainage water tank 57 has such a structure that, when a prescribed amount of drainage water is stored in drainage water tank 57, the stored drainage water cannot allow air to pass through drainage water tank 57. By such a water seal structure of drainage water tank 57, entry of air outside combustion apparatus 50 (outside air) into combustion apparatus 50 (secondary heat exchanger 53) through drainage water tank 57 via pipe 66 can be prevented.

A water supply pipe 63 is connected to one end of heat conduction pipe 53b of secondary heat exchanger 53 and a hot water delivery pipe 64 is connected to one end of heat conduction pipe 52a of primary heat exchanger 52. The other end of heat conduction pipe 52a of primary heat exchanger 52 and the other end of heat conduction pipe 53b of secondary heat exchanger 53 are connected to each other through a connection pipe 65. Each of gas supply pipe 62, water supply pipe 63 and hot water delivery pipe 64 described above leads to the outside, for example, in a top portion of combustion apparatus 50. Burner 51, primary heat exchanger 52, secondary heat exchanger 53, exhaust box 54, fan 55, drainage water tank 57, and the like are arranged in housing 58.

Then, referring to FIGS. 5 to 7, the configuration of an insertion jig 1 for inserting exhaust tube 20 into exhaust pipe 30 according to the present embodiment will be hereinafter described.

Insertion jig 1 has a support portion 1a and a protruding portion 1b. Support portion 1a and protruding portion 1b are integrally formed. Insertion jig 1 is formed of resin. This resin may be polypropylene (PP), acrylonitrile-butadiene-styrene copolymerization synthetic resin (ABS), and polyvinyl chloride (PVC), for example. Support portion 1a is used for attaching insertion jig 1 to exhaust tube 20. Support portion 1a is configured such that it can be introduced into through hole TH of exhaust tube 20. Support portion 1a has a cylindrical portion 1c and a tongue portion 1d. Cylindrical portion 1c is connected to protruding portion 1b. Support portion 1a has an outer circumferential surface. The outer circumferential surface of cylindrical portion 1c is formed so as to extend along the entire circumference of the inner circumferential surface of exhaust tube 20 in the circumferential direction. Tongue portion 1d protrudes from cylindrical portion 1c to a side opposite to protruding portion 1b. Tongue portion 1d has an outer circumferential surface that is formed so as to extend along a part of the inner circumferential surface of exhaust tube 20 in the circumferential direction. Accordingly, tongue portion 1d is readily elastically deformed while facing the inner circumferential surface of exhaust tube 20.

According to the present embodiment, four tongue portions 1d are provided. These four tongue portions 1d are arranged uniformly in the circumferential direction of cylindrical portion 1c. It is to be noted that the number of tongue portions 1d is not limited to four, but may be two or more, or may be one.

Support portion 1a has a projection PP that projects from the outer circumferential surface to the outside. Specifically, projection PP is provided at the tip end of tongue portion 1d. Projection PP is hooked in recess HP provided in the inner circumferential surface of exhaust tube 20, so that support portion 1a is attached by exhaust tube 20.

Projection PP has a tip end portion TP and a root portion BP. Tip end portion TP protrudes from the outer circumferential surface of tongue portion 1d to the outside. Tip end portion TP is located in the outermost circumference of projection PP. Root portion BP is located on the outer circumferential surface of tongue portion 1d. Projection PP has a first inclined surface S1 that inclines from tip end portion TP toward root portion BP on the side of the other end portion 20b of exhaust tube 20. Namely, projection PP has a tapered shape such that its cross-sectional area is decreased toward the other end portion 20b of exhaust tube 20. First inclined surface S1 is provided at the tip end of tongue portion 1d.

Protruding portion 1b protrudes from support portion 1a to a side opposite to exhaust tube 20 in the state where support portion 1a is introduced into through hole TH from the one end portion 20a side of exhaust tube 20. Protruding portion 1b covers through hole TH on the one end portion 20a side of exhaust tube 20. Protruding portion 1b is curved convexly toward a side opposite to support portion 1a. Specifically, protruding portion 1b has a flange portion 1e and a curved portion 1f. Flange portion 1e is connected to support portion 1a and extends outward in the radial direction. Curved portion 1f is connected to the outer circumferential edge of flange portion 1e, and formed to be curved convexly relative to flange portion 1e, toward a side opposite to support portion 1a. Furthermore, flange portion 1e protrudes outward beyond the outer diameter of exhaust tube 20. Accordingly, when curved portion 1f is viewed from the curved portion 1f side in the direction toward support portion 1a, through hole TH of exhaust tube 20 cannot be seen.

Then, referring to FIGS. 5 and 8 to 12, a method of installing exhaust tube 20 according to the present embodiment will be described. The method of installing exhaust tube 20 according to the present embodiment is implemented by inserting exhaust tube 20 into exhaust pipe 30 that leads from the inside of a building 200 to the outside thereof.

Figure 5:
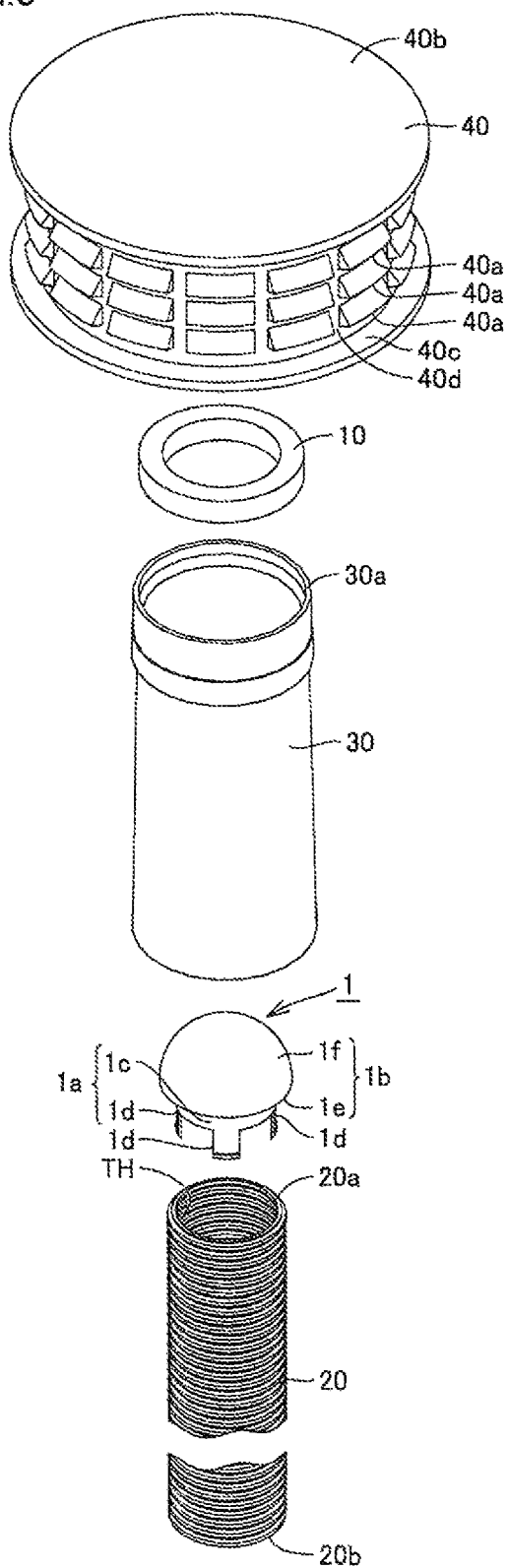
FIG. 5 is an exploded perspective view schematically showing the configurations of the exhaust structure for combustion apparatus and an insertion jig in one embodiment of the present invention.
Figure 6:
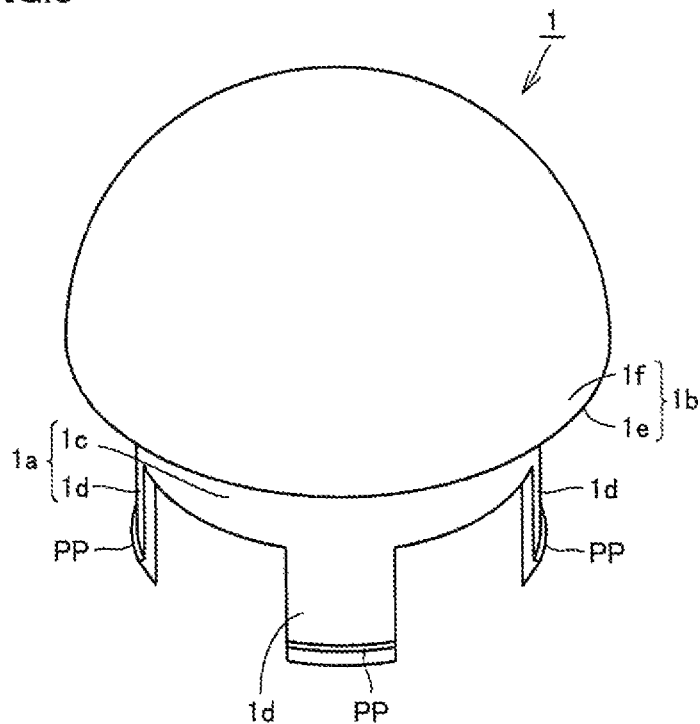
FIG. 6 is a perspective view schematically showing the configuration of the insertion jig in one embodiment of the present invention.
Figure 8:
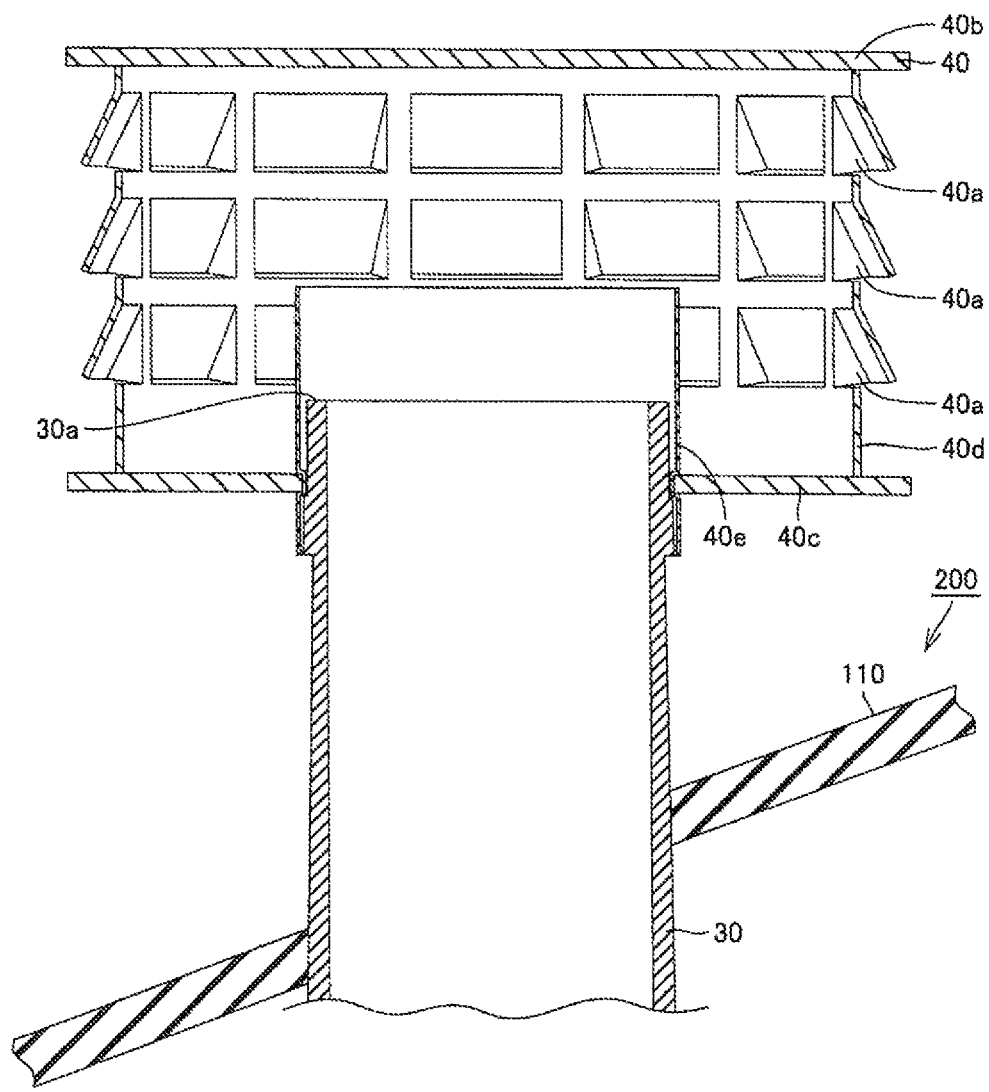
FIG. 8 is a cross-sectional view schematically showing the first step of a method of installing an exhaust tube in one embodiment of the present invention.

Referring to FIGS. 5 and 8, exhaust pipe 30 is placed in a roof 110 of building 200 so as to extend from the inside of building 200 to the outside thereof. Exhaust terminal 40 is attached to a tip end portion (near an upper end 30a) of this exhaust pipe 30 on the outside of the building. In this state, a preparation for inserting exhaust tube 20 into exhaust pipe 30 is made. Exhaust tube 20 described above is prepared. Also, insertion jig 1 described above is prepared.

Then, support portion 1a of insertion jig 1 is introduced into through hole TH from the one end portion 20a side of exhaust tube 20. Furthermore, projection PP of support portion 1a is engaged with recess HP of exhaust tube 20. Thereby, insertion jig 1 is fixed to exhaust tube 20.

Figure 9:
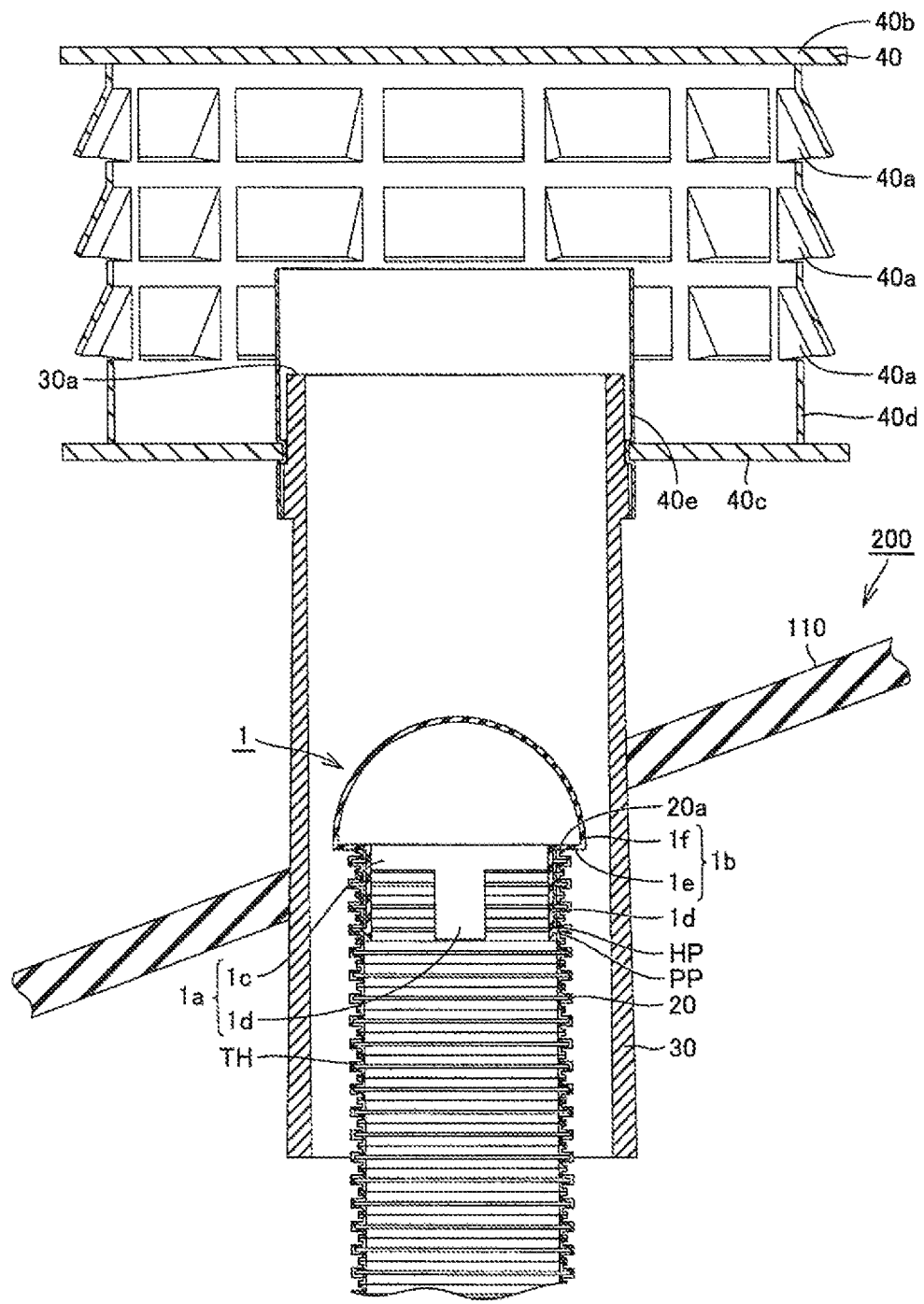
FIG. 9 is a cross-sectional view schematically showing the second step of the method of installing an exhaust tube in one embodiment of the present invention.

Referring to FIG. 9, an end of exhaust tube 20 on the side of one end portion 20a having insertion jig 1 fixed thereto is inserted into exhaust pipe 30. Exhaust tube 20 is inserted into exhaust pipe 30 in such a manner that curved portion 1f of protruding portion 1b in insertion jig 1 is disposed as a forefront portion. Then, exhaust tube 20 is pushed into exhaust pipe 30 from the inside of the building to the outside thereof.

Figure 10:
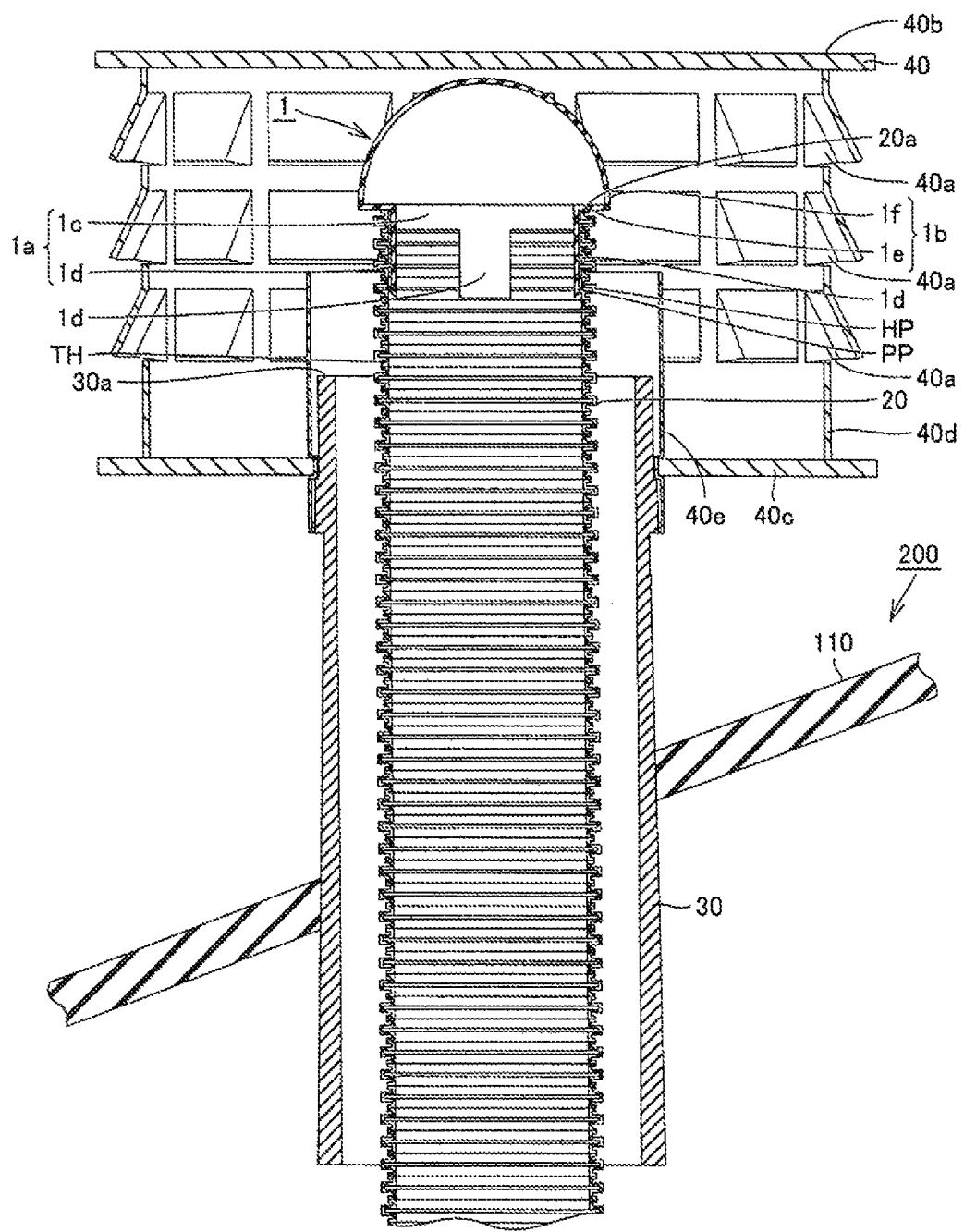
FIG. 10 is a cross-sectional view schematically showing the third step of the method of installing an exhaust tube in one embodiment of the present invention.

Referring to FIG. 10, exhaust tube 20 is inserted into exhaust pipe 30 until one end portion 20a of exhaust tube 20 protrudes from upper end 30a of exhaust pipe 30. Then, the other end portion 20b of exhaust tube 20 is connected to the combustion apparatus (connection pipe 56 of combustion apparatus 50: FIG. 3).

Figure 11:
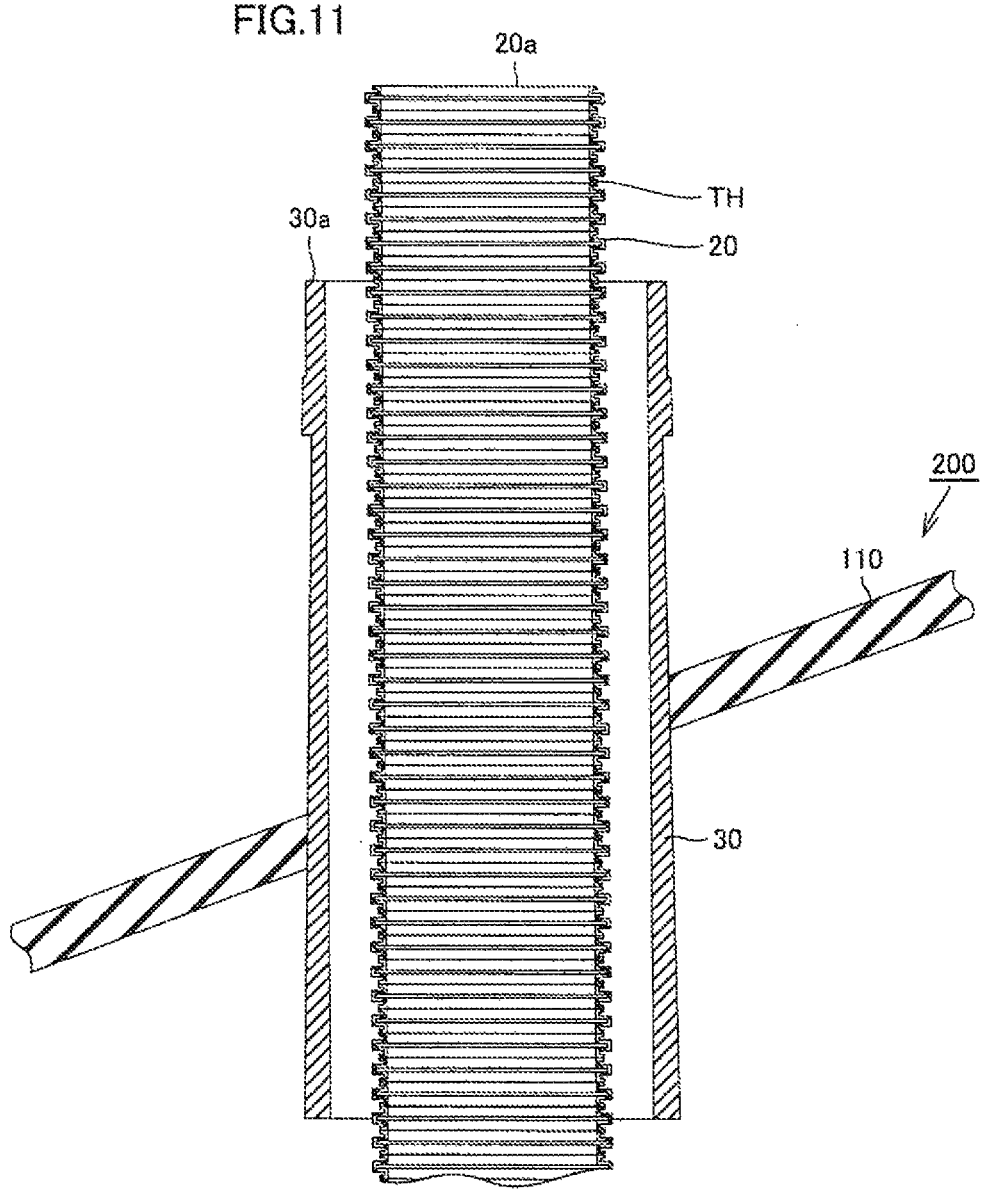
FIG. 11 is a cross-sectional view schematically showing the fourth step of the method of installing an exhaust tube in one embodiment of the present invention.

Referring to FIG. 11, exhaust terminal 40 is removed from exhaust pipe 30. Then, insertion jig 1 is removed from exhaust tube 20. At the tip end portion of exhaust pipe 30 on the outside of the building, projection PP of support portion 1a is pulled out from recess HP of exhaust tube 20. Then, support portion 1a of insertion jig 1 is pulled out from the one end portion 20a side of exhaust tube 20.

Figure 12:
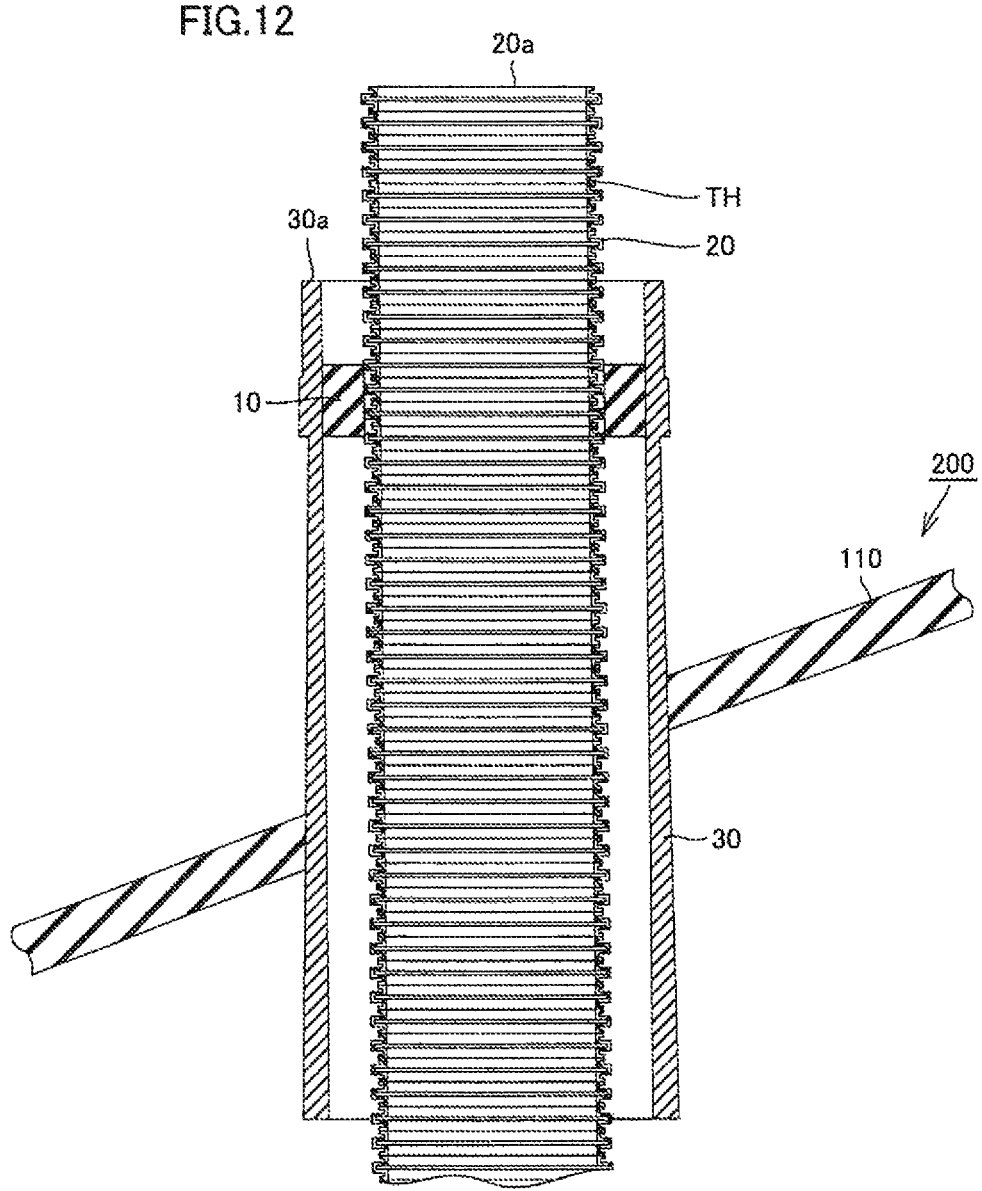
FIG. 12 is a cross-sectional view schematically showing the fifth step of the method of installing an exhaust tube in one embodiment of the present invention.

Referring to FIG. 12, exhaust adapter 10 is fitted on the outer circumferential surface of exhaust tube 20. Exhaust adapter 10 is fitted on the outer circumferential surface of exhaust tube 20 such that the inner circumferential surface of exhaust adapter 10 presses the outer circumferential surface of exhaust tube 20. Then, exhaust adapter 10 is inserted into exhaust pipe 30 from upper end 30a of exhaust pipe 30. In this case, exhaust adapter 10 is inserted into exhaust pipe 30 such that the outer circumferential surface of exhaust adapter 10 presses the inner circumferential surface of exhaust pipe 30.

Although an explanation has been given in the above with regard to the case where exhaust adapter 10 is inserted into exhaust pipe 30 from upper end 30a of exhaust pipe 30 after exhaust tube 20 is inserted into exhaust pipe 30, the present invention is not limited thereto. In other words, exhaust adapter 10 may be inserted into exhaust pipe 30 from the lower end of exhaust pipe 30 in the state where exhaust adapter 10 is fitted on the outer circumferential surface of exhaust tube 20. At the time of this insertion, exhaust adapter 10 is inserted into exhaust pipe 30 such that the outer circumferential surface of exhaust adapter 10 presses the inner circumferential surface of exhaust pipe 30.

Then, referring to FIGS. 13 to 16, the first to third modifications of insertion jig 1 according to the present embodiment will be hereinafter described. Since the configuration of insertion jig 1 in the first to third modifications other than the configurations particularly mentioned are almost the same as that of the present embodiment described above, the same components are designated by the same reference characters, and description thereof will not be repeated.

Figure 13:
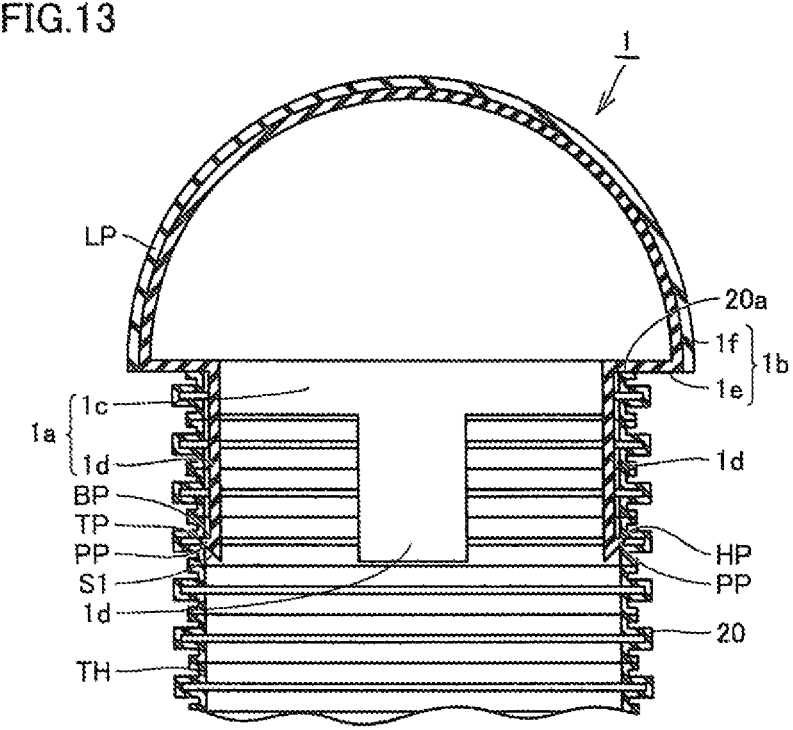
FIG. 13 is a cross-sectional view schematically showing the state where the first modification of the insertion jig in one embodiment of the present invention is attached to the exhaust tube.

Referring to FIG. 13, in the first modification of insertion jig 1 according to the present embodiment, insertion jig 1 is made of a resin molding product. In insertion jig 1, the surface of protruding portion 1b is subjected to low friction processing so as to have a coefficient of friction lower than that of the surface of exhaust tube 20. Low friction processing may be Teflon (registered trademark) coating or fluororesin coating, for example. Specifically, curved portion 1f has a surface provided with a low friction coefficient portion LP. It is preferable that low friction coefficient portion LP is provided on the entire surface of curved portion 1f.

Figure 14:
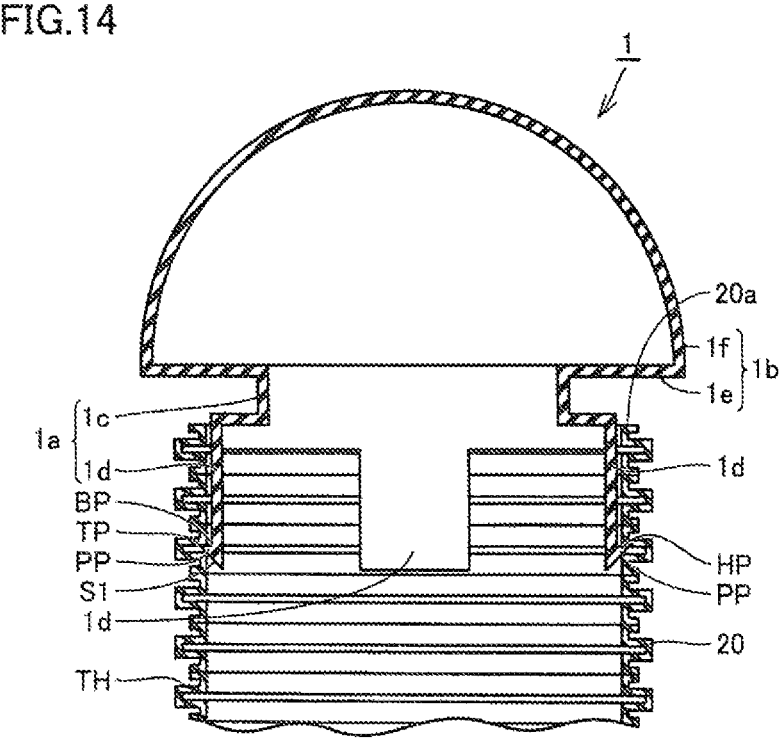
FIG. 14 is a cross-sectional view schematically showing the state where the second modification of the insertion jig in one embodiment of the present invention is attached to the exhaust tube.

Referring to FIG. 14, in the second modification of insertion jig 1 according to the present embodiment, protruding portion 1b can be deformed by coming into contact with the inner circumferential surface of exhaust pipe 30. Specifically, cylindrical portion 1c is decreased in diameter as compared with the present embodiment described above. Namely, cylindrical portion 1c is located inside relative to tongue portion 1d. Thereby, the strength of cylindrical portion 1c is weakened. Accordingly, when insertion jig 1 is fixed to exhaust tube 20 and inserted into exhaust pipe 30, protruding portion 1b is bent or inclined by coming into contact with the inner circumferential surface of exhaust pipe 30.

Figure 15:
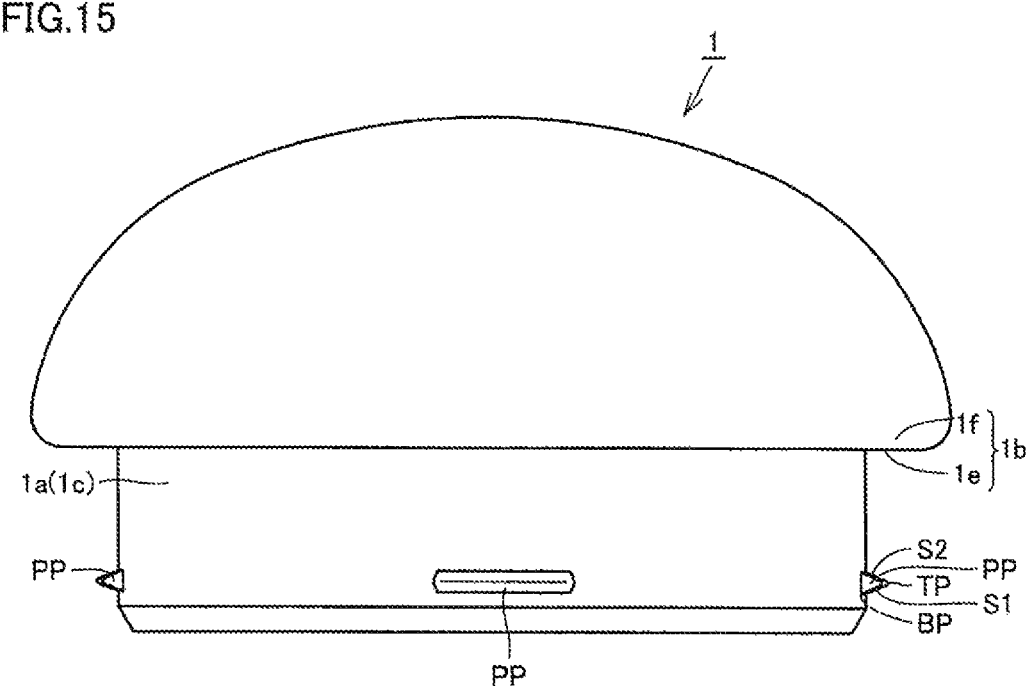
FIG. 15 is a side view schematically showing the configuration of the third modification of the insertion jig in one embodiment of the present invention.
Figure 16:
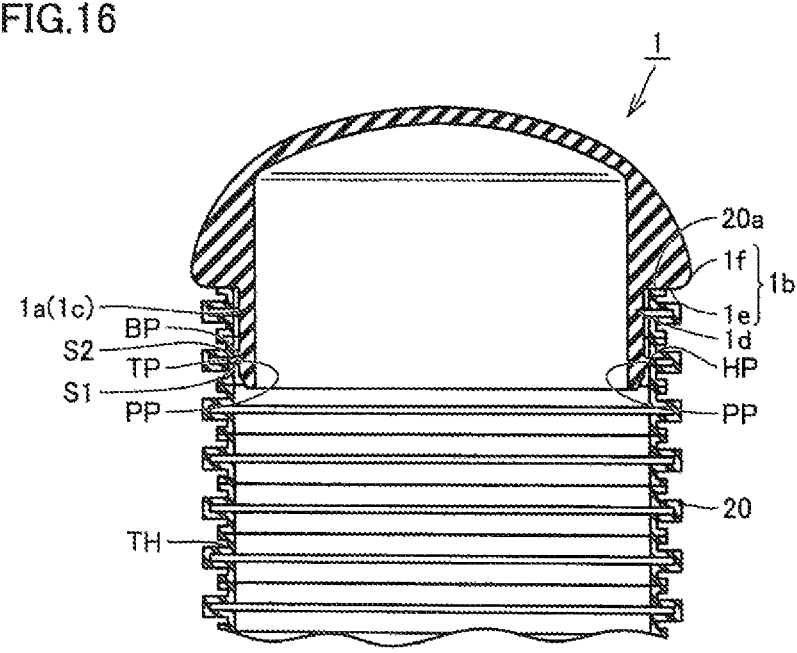
FIG. 16 is a cross-sectional view schematically showing the state where the third modification of the insertion jig in one embodiment of the present invention is attached to the exhaust tube.

Referring to FIGS. 15 and 16, in the third modification of insertion jig 1 according to the present embodiment, projection PP has a second inclined surface S2. Second inclined surface S2 inclines from tip end portion TP toward root portion BP on the one end portion 20a side of exhaust tube 20. Projection PP has a tapered shape such that its cross-sectional area is decreased toward one end portion 20a of exhaust tube 20.

Figure 7:
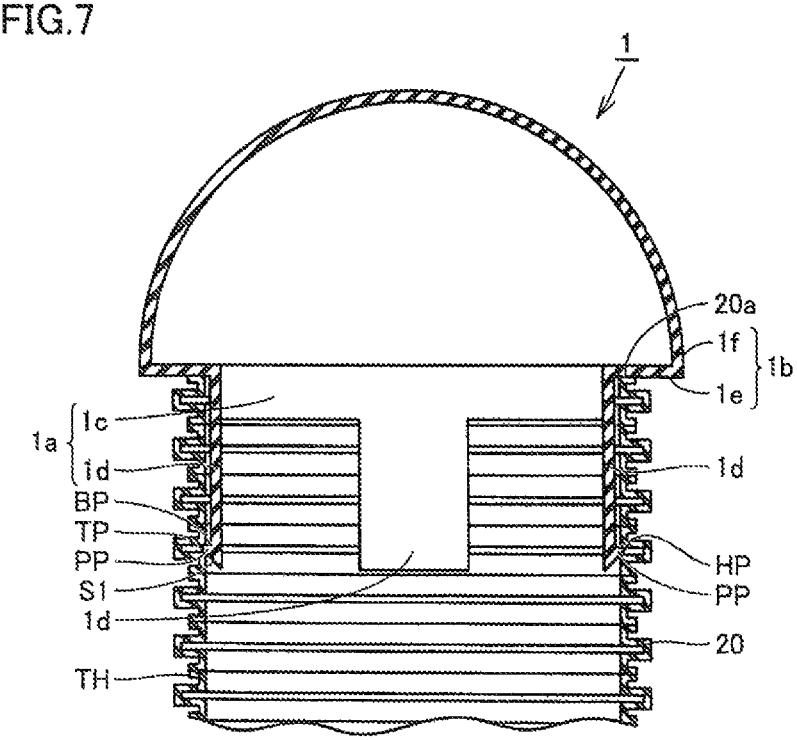
FIG. 7 is a cross-sectional view schematically showing the state where the insertion jig in one embodiment of the present invention is attached to the exhaust tube.

Furthermore, in the third modification of insertion jig 1 according to the present embodiment, support portion 1a is formed of cylindrical portion 1c, and does not have tongue portion 1d (FIG. 7). Projection PP is provided in cylindrical portion 1c. Cylindrical portion 1c has a tip end formed in a tapered shape such that the diameter of cylindrical portion 1c is decreased toward the tip end.

Then, the functions and effects of the present embodiment will be described.

According to the method of installing exhaust tube 20 of the present embodiment, as shown in FIG. 9, insertion jig 1 is fixed to exhaust tube 20 on the one end portion 20a side, and therefore, one end portion 20a of exhaust tube 20 does not get caught in the inner circumferential surface of exhaust pipe 30. Accordingly, exhaust tube 20 can be readily pushed in. Furthermore, since protruding portion 1b of insertion jig 1 covers through hole TH on the one end portion 20a side of exhaust tube 20, foreign substances can be suppressed from coming into exhaust tube 20 through the through hole TH on the one end portion 20a side of exhaust tube 20. Furthermore, since insertion jig 1 has support portion 1a and protruding portion 1b integrally formed, these support portion 1a and protruding portion 1b can be integrally attached. Accordingly, insertion jig 1 can readily be attached to exhaust tube 20.

In the method of installing exhaust tube 20 according to the present embodiment, protruding portion 1b is curved convexly toward a side opposite to support portion 1a. Accordingly, when insertion jig 1 is fixed to exhaust tube 20 and inserted into exhaust pipe 30, the frictional resistance between protruding portion 1b and the inner circumferential surface of exhaust pipe 30 can be reduced. Accordingly, exhaust tube 20 having insertion jig 1 fixed thereto can be smoothly pushed into exhaust pipe 30. Furthermore, even if exhaust pipe 30 is bent, exhaust tube 20 can be smoothly moved through exhaust pipe 30. Consequently, exhaust tube 20 having insertion jig 1 attached thereto can be smoothly inserted into exhaust pipe 30 and moved therein.

In the method of installing exhaust tube 20 according to the present embodiment, as shown in FIG. 13, the surface of protruding portion 1b is subjected to low friction processing. Accordingly, when insertion jig 1 is fixed to exhaust tube 20 and inserted into exhaust pipe 30, the frictional resistance between protruding portion 1b and the inner circumferential surface of exhaust pipe 30 can be further reduced. Thereby, exhaust tube 20 having insertion jig 1 fixed thereto can be further smoothly pushed into exhaust pipe 30.

In the method of installing exhaust tube 20 according to the present embodiment, as shown in FIG. 14, protruding portion 1b can be deformed by coming into contact with the inner circumferential surface of exhaust pipe 30. Accordingly, when insertion jig 1 is fixed to exhaust tube 20 and inserted into exhaust pipe 30, protruding portion 1b is deformed by coming into contact with the inner circumferential surface of exhaust pipe 30. This causes protruding portion 1b to be deformed corresponding to the shape of the inner circumferential surface of exhaust pipe 30, so that exhaust tube 20 having insertion jig 1 fixed thereto can be pushed into exhaust pipe 30 with reduced force. Therefore, when exhaust tube 20 having insertion jig 1 fixed thereto is pushed into exhaust pipe 30, it becomes possible to suppress removal of the connection portion of exhaust pipe 30 caused by insertion jig 1 pressing this connection portion of exhaust pipe 30.

In the method of installing exhaust tube 20 according to the present embodiment, as shown in FIG. 7, projection PP has first inclined surface S1 that inclines from tip end portion TP toward root portion BP on the other end portion 20b side of exhaust tube 20. Accordingly, when support portion 1a is introduced into through hole TH from the one end portion 20a side of exhaust tube 20, the frictional resistance between projection PP and the inner circumferential surface of exhaust tube 20 can be reduced by first inclined surface S1.

In the method of installing exhaust tube 20 according to the present embodiment, as shown in FIGS. 15 and 16, projection PP has second inclined surface S2 that inclines from tip end portion TP toward root portion BP on the one end portion 20a side of exhaust tube 20. Accordingly, when support portion 1a is pulled out through the through hole TH of exhaust tube 20, the frictional resistance between projection PP and the inner circumferential surface of exhaust tube 20 can be reduced by second inclined surface S2.

In the method of installing exhaust tube 20 according to the present embodiment, as shown in FIG. 11, at the tip end portion of exhaust pipe 30 on the outside of the building, projection PP of support portion 1a is pulled out from recess HP of exhaust tube 20, and support portion 1a of insertion jig 1 is pulled out from the one end portion 20a side of exhaust tube 20. Accordingly, insertion jig 1 can be removed from exhaust tube 20 by pulling out this insertion jig 1 from exhaust tube 20. Therefore, insertion jig 1 can readily be removed from exhaust tube 20.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A method of installing an exhaust tube by inserting an exhaust tube into an exhaust pipe leading from inside of a building to outside thereof, said method comprising the steps of:

preparing said exhaust tube having a first end portion and a second end portion, a through hole extending from said first end portion to said second end portion, and a recess provided in an inner circumferential surface of said through hole, said exhaust tube being formed of a flexible tube made of resin;

preparing an insertion jig including an outer circumferential surface, a support portion having a cylindrical portion, tongue portions and a projection that projects from said outer circumferential surface toward an outside of said support portion, and a protruding portion that protrudes from said support portion to a side opposite to said exhaust tube in a state where said support portion is introduced into said through hole from a side of said first end portion of said exhaust tube, said protruding portion covering said through hole on the side of said first end portion of said exhaust tube, and said support portion and said protruding portion being integrally formed, the cylindrical portion being connected to the protruding portion, the cylindrical portion having an outer circumferential surface, the tongue portions protruding from the cylindrical portion to a side opposite to the protruding portion and each of the tongue portions has an outer circumferential surface;

introducing said support portion of said insertion jig into said through hole from the side of said first end portion of said exhaust tube, and engaging said projection of said support portion with said recess such that the outer circumferential surface of the cylindrical portion extends along the entire circumference of the inner circumferential surface of the exhaust tube in the circumferential direction and the outer circumferential surfaces of the tongue portions extend along a part of the inner circumferential surface of the exhaust tube in the circumferential direction, to fix said insertion jig to said exhaust tube; and inserting, into said exhaust pipe, an end of said exhaust tube on the side of said first end portion having said insertion jig fixed thereto, and pushing said exhaust tube from inside of said building to outside thereof.

2. The method of installing an exhaust tube according to claim 1, wherein said protruding portion is curved convexly toward a side opposite to said support portion.

3. The method of installing an exhaust tube according to claim 2, wherein said insertion jig is formed of a resin molding product, and said protruding portion has a surface that is subjected to low friction processing such that said surface is lower in coefficient of friction than a surface of said exhaust tube.

4. The method of installing an exhaust tube according to claim 2, wherein said projection includes a tip end portion and a root portion, and has a first inclined surface that inclines from said tip end portion toward said root portion on a side of said second end portion.

5. The method of installing an exhaust tube according to claim 1, wherein said insertion jig is formed of a resin molding product, and said protruding portion has a surface that is subjected to low friction processing such that said surface is lower in coefficient of friction than a surface of said exhaust tube.

6. The method of installing an exhaust tube according to claim 1, wherein said protruding portion can be deformed by coming into contact with an inner circumferential surface of said exhaust pipe.

7. The method of installing an exhaust tube according to claim 1, wherein said projection includes a tip end portion and a root portion, and has a first inclined surface that inclines from said tip end portion toward said root portion on a side of said second end portion.

8. The method of installing an exhaust tube according to claim 6, wherein said projection has a second inclined surface that inclines from said tip end portion toward said root portion on the side of said first end portion.

9. The method of installing an exhaust tube according to claim 1, wherein said projection includes a tip end portion and a root portion, and has a second inclined surface that inclines from said tip end portion toward said root portion on the side of said first end portion.

10. The method of installing an exhaust tube according to claim 1, further comprising the step of pulling out said support portion of said insertion jig from the side of said first end portion of said exhaust tube, at a tip end portion of said exhaust pipe on outside of the building.

* * * * *